D. D. GITT.
Plow-Cleaner.
No. 7,344. Patented May 7, 1850.
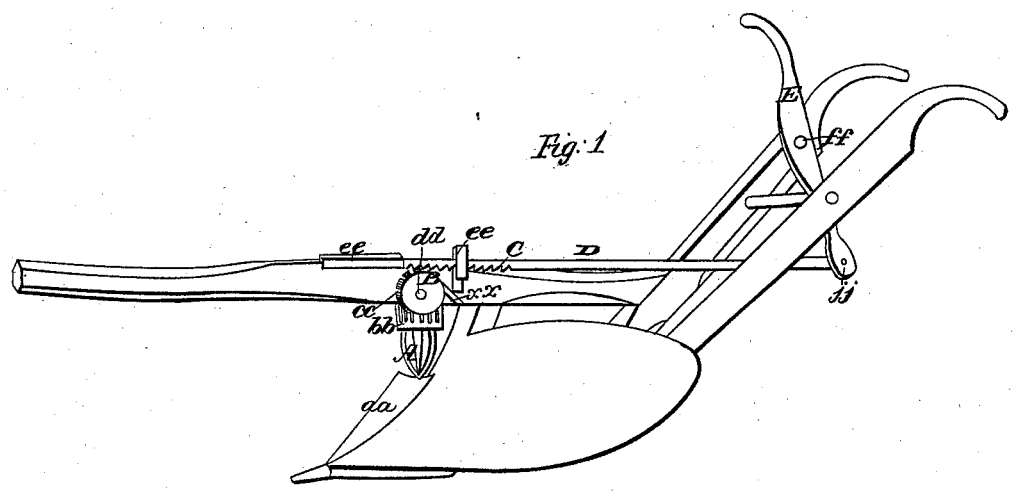
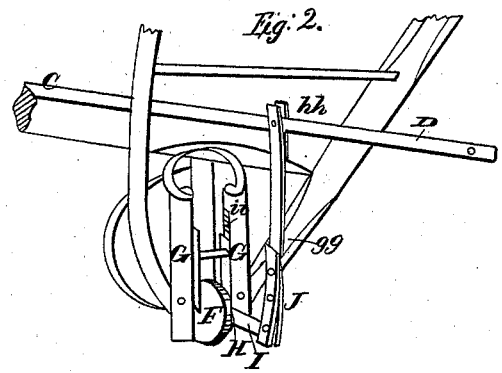
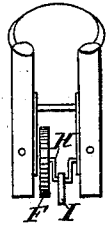

UNITED STATES PATENT OFFICE.

DANL. D. GITT, OF BUTLER TOWNSHIP, ADAMS COUNTY, PENNSYLVANIA.

IMPROVEMENT IN PLOW-CLEANERS.

Specification forming part of Letters Patent No. 7,344, dated May 7, 1850.

*To all whom it may concern:*

Be it known that I, DANIEL D. GITT, of Butler township, in the county of Adams and State of Pennsylvania, have invented a new and Improved Mode of Cleaning a Plow in the Operation of Plowing; and I do hereby declare that the following is a full and exact description.

The nature of my invention consists in the combination of a vertical wheel, a rack or notched arm, and a lever with a conical fluted roller placed under the beam and upon the cutter of a plow, for the purpose of working the said roller in the operation of plowing, and cleaning the plow; and also the substituting for this arrangement, if desired, a self-acting combination consisting of a self-adjusting wheel running in the furrow, having a crank connected with it, with a pitman working a lever attached to the rack or notched arm used in the first arrangement, and (the progress of the plow putting the wheel in the furrow in motion) by means of the crank, pitman, lever, rack, and vertical wheel operating the conical roller, and thus cleaning the plow in the operation of plowing.

To enable others skilled in the art to make and use my invention, I will proceed to describe its construction and operation, reference being had to the annexed drawings, making a part of this specification, in which—

Figure 1 represents a perspective view of a plow with my first improved combination for operating the roller complete; and Fig. 2, my second self-acting combination for operating the conical roller and cleaning the plow, in which, however, the vertical wheel and conical roller are not shown.

I construct the plow in any of the known forms. Upon the cutter *a a*, the form of which I so adapt as to answer my purpose, let there be placed a fluted conical roller, A, with a narrow base turning in a socket or upon a pivot on the cutter, and with its upper end or inverted base as broad as the beam of the plow, and having a gudgeon running in the beam. Around the top of this conical roller are cogs *b b*, beveled or otherwise. Above the conical roller I attach to the side of the beam a vertical wheel, B, with cogs *c c*, which work into the cogs *b b* of the conical roller, this wheel being secured to the side of the beam by a fixture, *d d*. Upon this wheel I place a rack, C, with an arm, D, extending along the beam and beyond it, to which it is secured by fixtures *e e*, or some similar fixture, allowing the arm to move. With this arm D a lever, E, is connected, perpendicular to it at its extremity, and attached midway to the land-side handle of the plow by a pin, *f f*, upon which it works as its focus. The power is applied by the hand of the plowman.

If desired, the wheel at the side of the beam may be omitted, and the notched arm be applied directly to the conical roller A. I have now described my first combination.

My second self-acting combination is constructed as follows: I use the notched arm and vertical wheel with the conical roller, as in the first combination, omitting the lever E. I construct a wheel, F, which I place vertically in the furrow, between the mold-board and land-side of the plow. The axle or gudgeons of this wheel are let into two hollow arms which support it, they being secured above to the arms, &c., of the plow, and allowing the wheel and crank connected with it to revolve between them. Each of these supporting-arms has within it a pair of spiral springs, one above the gudgeon and the other below it, and has a slit or opening on its inner side to allow the gudgeons or axle to work up and down, and thus the wheel, by its own weight, to press itself down, so as to keep in contact with the furrow when the plow is raised behind, or however shifted; or the pressing down of the plow behind may force the gudgeons to press up the upper springs and still allow the wheel to turn in the furrow. With this wheel F, I connect a crank, H, referred to above, and with this crank a pitman or arm, I, with its extremity connected with a double-acting lever, J, having its fulcrum in its center at its attachment by a pin, *g g*, to the land-side handle of the plow, and its upper extremity attached to the arm D of the rack C.

I disclaim a stationary or fixed wheel in the furrow, but claim the self-adjusting wheel in the furrow. By this arrangement the wheel F running in the furrow will remain constantly in contact with the ground and continue to revolve, whether the plow be raised or lowered, or however shifted, and by this arrangement only can the wheel be practically self-operating.

When it is desired to use the self-acting combination the lever E in the first combination is loosened from the arm of the rack by drawing out the pin $jj$ by which they are connected.

The operation of each of these combinations in working the conical roller will at once be apparent from my description of their construction. The hand of the plowman being applied to the lever E in the first combination, the notched arm is propelled forward, acting upon the vertical wheel B, which revolves the conical roller in the direction of the furrow, thus discharging all the weeds and rubbish which have collected against the plow, which are at once caught and buried by the furrow. To prevent the conical roller from revolving and discharging on the land side, a click, $x\,x$, is fastened to the beam, which falls into the cogs and causes the rack to slide on its return.

By means of the second combination the progress of the plow putting the wheel F in the furrow in motion, each revolution which the crank H makes gives a forward and backward stroke to the pitman I, which operating the double-acting lever J it propels the notched arm, and by means of it and the vertical wheel B operates the conical roller A, and thus by a self-acting operation the earth and rubbish, &c., are removed from the plow in the operation of plowing. When it is desired to use the first combination alone, to prevent the wheel in the furrow from operating I press up the springs $i\,i$ in the hollow arms G G, and stick in a pin below the gudgeons to keep it from the earth.

I disclaim the use of the conical roller by itself.

Some of the advantages of my improved combinations over a stationary cone or cone without machinery to operate it are, first, the certainty of its operation; second, its always discharging the rubbish on the furrow side.

A fixed cone or cone upon a vertical axle without a provision to operate it is uncertain in its movements, and, indeed, of moving at all. There is much friction. Earth getting in clogs and prevents its motion. If it do not move, it is useless; if it should, it is as apt to discharge on the land side as into the furrow, and thus to clog the plow the more on its return. The fluted cone catches and holds the rubbish, and is especially useful in discharging briers. In most cases the first combination will be found to answer the purpose of cleaning a plow most satisfactorily. A self-operating cleaner is certainly a great improvement over the cone stationary or without a motive arrangement.

What I claim as my invention, and desire to secure by Letters Patent, is—

The combination of the lever, notched arm, and vertical wheel B with a conical roller placed under the beam and upon the cutter of the plow, as above described, for the purpose of operating the conical roller and cleaning the plow in the operation of plowing, as set forth.

DANIEL D. GITT.

Witnesses:
  D. McCONAUGHY,
  J. B. DANNER.